No. 762,310. PATENTED JUNE 14, 1904.
J. HOLLAND.
RUBBER TIRE.
APPLICATION FILED JAN. 25, 1904.
NO MODEL.
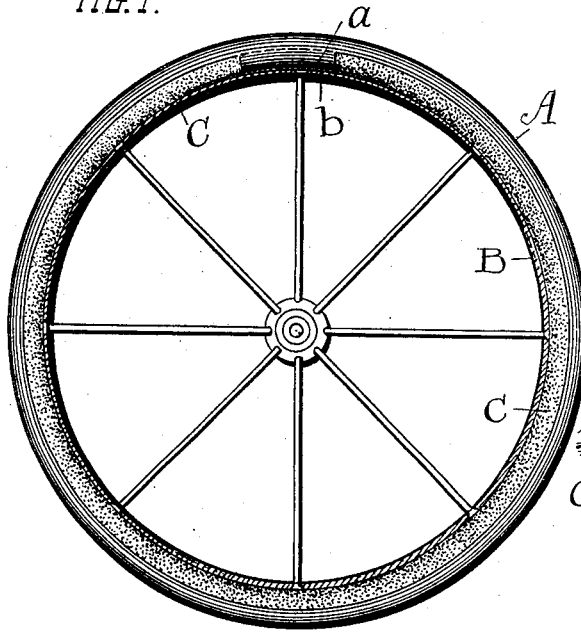
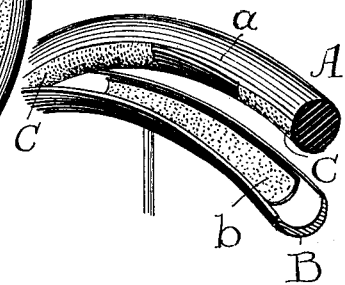
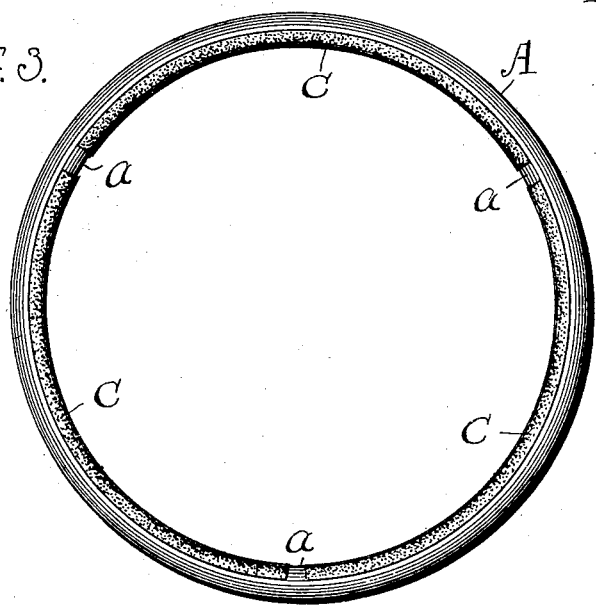
WITNESSES:
INVENTOR.
JOSEPH HOLLAND
BY
ATTORNEY.

No. 762,310.

Patented June 14, 1904.

UNITED STATES PATENT OFFICE.

JOSEPH HOLLAND, OF AKRON, OHIO.

RUBBER TIRE.

SPECIFICATION forming part of Letters Patent No. 762,310, dated June 14, 1904.

Application filed January 25, 1904. Serial No. 190,457. (No model.)

*To all whom it may concern:*

Be it known that I, JOSEPH HOLLAND, a subject of the King of Great Britain, residing at Akron, in the county of Summit and State of Ohio, have invented certain new and useful Improvements in Rubber Tires; and I do declare that the following is a full, clear, and exact description of the invention, which will enable others skilled in the art to which it appertains to make and use the same.

My invention relates to improvements in rubber tires; and the object of the invention is to provide a rubber tire which can be so secured upon a wheel that it will be impossible for the tire to become displaced from the wheel by accident or otherwise during its use and which will prevent uneven wearing of the tire and avoid making weak places therein. This statement, however, is meant to apply more especially to what are known as "solid" rubber tires, and such as are used on baby-carriages and smaller wheels of that kind, as will appear in a further description of the invention and is especially set forth in the claims.

In the accompanying drawings, Figure 1 is a side elevation of a wheel embodying my invention with the rim thereof sectioned away substantially to its middle portion all around. Fig. 2 is a perspective view of a fragment or portion of the tire and a rim therefor and showing the means employed for permanently fixing the tire in or upon the rim, as hereinafter fully set forth. Fig. 3 is a side elevation of one style of tire as it is produced for the trade under my invention and modified as compared with Fig. 1.

A represents a continuous solid elastic rubber tire, the same being manufactured without welding, cementing, or blending, as has hereto been practiced quite generally with small rubber tires of this general character. In such tires heretofore the tire was made to wrap around the rim and then its ends were connected and cemented. Sometimes, also, it was necessary to run a wire centrally through the rubber tire and in placing the tire upon a wheel to twist the ends of the wire together and cement the ends after this was done; but experience has demonstrated that this cemented or jointed place very soon becomes a weak place in the tire and that the tire gives way and breaks at this point, and thus becomes unserviceable and requires replacing by a new tire.

By my construction I make the whole tire uniform and of like quality and character all around, so that it has no weak points as such and has no cemented or similarly-united joint. Of course the tire is more or less elastic and must be; but I have so constructed it that this elasticity is used only to place it upon the hollow rim B and that when it is upon the rim it is prevented from stretching, and therefore compelled to remain in working position on the wheel, because it cannot stretch and roll out of the rim. To this end I provide the tire with a suitably-heavy non-stretchable fabric lining C about its inside, having width corresponding substantially to the width of trough of the rim B. This lining may be a strip of strong tape of the requisite width permanently cemented upon the tire A at the time of manufacture, so that the tire is furnished to the market with the said tape secured thereon for use; but in any case there must be a gap or unlined portion, as indicated by *a* in the several figures, which is not thus covered or provided with lining at the start, so as to have an elastic portion to spring the tire over the rim. There may be two or more of these uncovered portions *a* of the tire, and there is but one shown in Fig. 1, while there are three shown in Fig. 3. More than this is not required, and I have found that a single unlined portion corresponding in size relatively to gap *a* in Fig. 1 will answer every purpose; but when once the tire is sprung upon the rim and properly adjusted thereon, so that the lining C will lie in the trough of the rim, as described, I proceed to also line the gap or unlined portion *a*. This is done by means of a piece of fabric *b*, which is preferably of the same kind as the other lining and of a length to overlap the ends thereof relatively as seen in Fig. 2. This strip is freshly cemented or coated on its outside with a suitable adhesive, such as rubber-cement, at the same time the tire is placed upon the rim. Then as the tire with its own lining is sprung upon the rim over this piece the piece itself adheres to the tire and becomes, in effect, the same as if it were applied thereto originally in the manufacture of the tire-like lining C and makes a continuous lined surface, and as the said lining is non-stretchable or non-elastic it is evident that there is no possibility of getting the tire off except by cutting it for that purpose.

The lining C is incorporated with the rubber when the tire is molded, so that it is essentially an inherent part of the tire and not an after or supplemental part, and the tire is not complete as an article without it.

What I claim is—

1. As a new article of manufacture, a solid continuous elastic rubber tire having a non-elastic lining cemented to its inner circumference and the ends of said lining spaced apart, thereby leaving an unlined stretchable portion adapting the tire to be sprung upon the wheel, substantially as described.

2. In rubber-tired wheels, a continuous solid rubber tire having its inner circumference covered with a non-elastic lining less than the entire distance around, and a strip of non-elastic material covering the otherwise unlined portion of the tire and overlapping the ends of the lining thereon, substantially as described.

3. A rubber-tired wheel having a rim trough-shaped in cross-section, a rubber tire about said rim having a non-elastic lining adhered thereto, said lining separated at its ends, and a separate piece of lining connecting the said ends and adhered thereto and to the tire, substantially as described.

4. In rubber-tired wheels, the combination of a wheel-rim with an endless rubber-tire having non-stretchable portions with an intervening stretchable portion, and means to unite said non-stretchable portions after the tire is in place upon said rim, said means comprising a non-stretchable connecting-strip bridging said stretchable portion of the tire, substantially as described.

In testimony whereof I sign this specification in the presence of two witnesses.

JOSEPH HOLLAND.

Witnesses:
R. B. MOSER,
C. A. SELL.